United States Patent
Colgrove et al.

(10) Patent No.: US 9,760,313 B1
(45) Date of Patent: Sep. 12, 2017

(54) PERFORMING COPIES IN A STORAGE SYSTEM

(71) Applicant: Pure Storage, Inc., Mountain View, CA (US)

(72) Inventors: John Colgrove, Los Altos, CA (US); Ethan Miller, Santa Cruz, CA (US); John Hayes, Mountain View, CA (US); Cary Sandvig, Palo Alto, CA (US); Christopher Golden, Mountain View, CA (US); Jianting Cao, Sunnyvale, CA (US); Grigori Inozemtsev, San Jose, CA (US)

(73) Assignee: Pure Storage, Inc., Mountain View, CA (US)

( * ) Notice: Subject to any disclaimer, the term of this patent is extended or adjusted under 35 U.S.C. 154(b) by 41 days.

(21) Appl. No.: 15/139,408

(22) Filed: Apr. 27, 2016

Related U.S. Application Data

(63) Continuation of application No. 14/737,927, filed on Jun. 12, 2015, now Pat. No. 9,361,035, which is a continuation of application No. 14/046,872, filed on Oct. 4, 2013, now Pat. No. 9,063,967.

(60) Provisional application No. 61/751,142, filed on Jan. 10, 2013.

(51) Int. Cl.
  *G06F 3/06* (2006.01)

(52) U.S. Cl.
  CPC ............ *G06F 3/0665* (2013.01); *G06F 3/065* (2013.01); *G06F 3/0619* (2013.01); *G06F 3/0685* (2013.01)

(58) Field of Classification Search
  None
  See application file for complete search history.

(56) References Cited

U.S. PATENT DOCUMENTS

| | | | |
|---|---|---|---|
| 5,208,813 | A | 5/1993 | Stallmo |
| 6,412,045 | B1 | 6/2002 | DeKoning et al. |
| 6,799,283 | B1 | 9/2004 | Tamai et al. |
| 6,915,434 | B1 | 7/2005 | Kuroda |

(Continued)

FOREIGN PATENT DOCUMENTS

| | | |
|---|---|---|
| WO | WO-2008/102347 A1 | 8/2008 |
| WO | WO-2010/071655 A1 | 6/2010 |

OTHER PUBLICATIONS

PCT Search Report and Written Opinion, Mar. 24, 2014; PCT Application No. PCT/US14/10690.

(Continued)

*Primary Examiner* — Scott Sun
(74) *Attorney, Agent, or Firm* — Edward J. Lenart; Kennedy Lenart Spraggins LLP

(57) ABSTRACT

A system and method for performing copy offload operations. When a copy offload operation from a first volume (pointing to a first medium) to a second volume (pointing to a second medium) is requested, the copy offload operation is performed without accessing the data being copied. A third medium is created, and the first medium is recorded as the underlying medium of the third medium. The first volume is re-pointed to the third medium. Also, a fourth medium is created, the second volume is re-pointed to the fourth medium, and the second medium is recorded as the underlying medium of the targeted range of the fourth medium. All other ranges of the fourth medium have the second medium as their underlying medium.

20 Claims, 7 Drawing Sheets

(56) References Cited

U.S. PATENT DOCUMENTS

| | | |
|---|---|---|
| 7,028,216 B2 | 4/2006 | Aizawa et al. |
| 7,216,164 B1 | 5/2007 | Whitmore et al. |
| 8,290,911 B1 | 10/2012 | Janakiraman et al. |
| 8,352,540 B2 | 1/2013 | Anglin et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 2002/0038436 A1 | 3/2002 | Suzuki |
| 2004/0049572 A1 | 3/2004 | Yamamoto et al. |
| 2006/0174074 A1 | 8/2006 | Banikazemi et al. |
| 2007/0171562 A1 | 7/2007 | Maejima et al. |
| 2007/0220313 A1 | 9/2007 | Katsuragi et al. |
| 2008/0059699 A1 | 3/2008 | Kubo et al. |
| 2008/0155191 A1 | 6/2008 | Anderson et al. |
| 2008/0178040 A1 | 7/2008 | Kobayashi |
| 2008/0275928 A1 | 11/2008 | Shuster |
| 2009/0204858 A1 | 8/2009 | Kawaba |
| 2009/0228648 A1 | 9/2009 | Wack |
| 2010/0067706 A1 | 3/2010 | Anan et al. |
| 2010/0250882 A1* | 9/2010 | Hutchison ............ G06F 11/1451 711/162 |
| 2011/0191555 A1 | 8/2011 | Narayanan |
| 2011/0238634 A1 | 9/2011 | Kobara |
| 2012/0023375 A1 | 1/2012 | Dutta et al. |
| 2012/0330903 A1 | 12/2012 | Periyagaram et al. |
| 2013/0046995 A1 | 2/2013 | Movshovitz |
| 2013/0047029 A1 | 2/2013 | Ikeuchi et al. |
| 2013/0073826 A1 | 3/2013 | Tatara |
| 2013/0091102 A1 | 4/2013 | Nayak |
| 2013/0339303 A1* | 12/2013 | Potter ............... G06F 17/30581 707/649 |
| 2014/0059308 A1 | 2/2014 | Blea |
| 2014/0089730 A1 | 3/2014 | Watanabe et al. |
| 2014/0172929 A1 | 6/2014 | Sedayao et al. |
| 2014/0281308 A1 | 9/2014 | Lango et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |

OTHER PUBLICATIONS

Microsoft Corporation, "GCSettings.IsServerGC Property", Retrieved Oct. 27, 2013 via the WayBack Machine, 3 pages.

Microsoft Corporation, "Fundamentals of Garbage Collection", Retrieved Aug. 30, 2013 via the WayBack Machine, 11 pages.

* cited by examiner

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-999 | RU | 5 | 0 | 2 | N |
| 8 | 0-499 | R | 8 | 500 | 1 | N |
| 10 | 0-999 | QU | 10 | 0 | 1 | Y |
| 14 | 0-999 | RU | 14 | 0 | 10 | Y |
| 18 | 0-999 | RU | 18 | 0 | 14 | N |
| 25 | 0-999 | RU | 25 | 0 | 14 | Y |
| 33 | 0-999 | RU | 33 | 0 | 25 | N |
| 35 | 0-299 | RU | 35 | 400 | 18 | N |
| 35 | 300-499 | RU | 35 | -300 | 33 | Y |
| 35 | 500-899 | RU | 35 | -400 | 5 | N |

Q – Quiescent, R – Registered, U – Unmask

FIG. 3

PERFORMING COPIES IN A STORAGE SYSTEM

CROSS REFERENCE TO RELATED APPLICATIONS

This application is a continuation application of and claims priority to U.S. patent application Ser. No. 14/737,927, filed on Jun. 12, 2015, which is a continuation of and claims priority to U.S. Pat. No. 9,063,967, issued Jun. 23, 2015, which claims the benefit of U.S. Provisional Application No. 61/751,142, filed Jan. 10, 2013.

BACKGROUND

Technical Field

This invention relates to performing a copy offload operation in a storage system.

Background Art

Maintaining data is an essential part of operating a business, whether for product development, human resources, finance, or otherwise. As part of the maintenance of such data, the need to create copies of the data often arises for any of a variety of reasons. One approach to creating copies involves a client (e.g., coupled to a storage system via a network) being actively engaged in the copy process. In this approach the client processor(s) initiates and manages transactions which are conveyed to the storage device throughout the copy process. As such, the client processor is busy with the copy operation and generally unable to engage in other work. Another approach to copying data involves offloading the management of the copy process to another processor(s). For example, the copy process may be offloaded to a storage system which then manages the copy process. Such an approach may be referred to as "copy offload." In this manner, the client is generally freed to perform other work while the copy is being performed. A copy offload operation refers to an operation in which the storage system copies data (often large quantities of data) from one location to another, either within a single volume or between two volumes.

In view of the above, systems and methods for efficiently performing copy offload operations are desired.

SUMMARY OF THE INVENTION

Various embodiments of systems and methods for performing copy offload operations are contemplated.

A storage system may include a storage controller and one or more storage devices. The storage system may be coupled to one or more host client systems. In one embodiment, the storage controller may utilize volumes and mediums to track client data that is stored in the storage system. A medium is defined as a logical grouping of data, and each medium has an identifier with which to identify the logical grouping of data. The storage controller may maintain a volume to medium mapping table to map each volume to a single medium, and this medium is referred to as the volume's anchor medium. Each medium may be mapped to any number of other mediums, and the storage controller may also maintain a medium mapping table to track mappings between mediums.

When a host system requests a copy offload operations to copy data from a first volume to a second volume (or from a first location within the first volume to a second location within the first volume), the storage controller may perform a copy offload operation solely by manipulating the volume to medium mapping table and the medium mapping table without accessing the data being copied. As a result, the copy offload operation may be performed quickly and with minimal utilization of the storage system resources.

These and other embodiments will become apparent upon consideration of the following description and accompanying drawings.

BRIEF DESCRIPTION OF THE DRAWINGS

FIG. 3 illustrates one embodiment of a medium mapping table.

Figure 1:
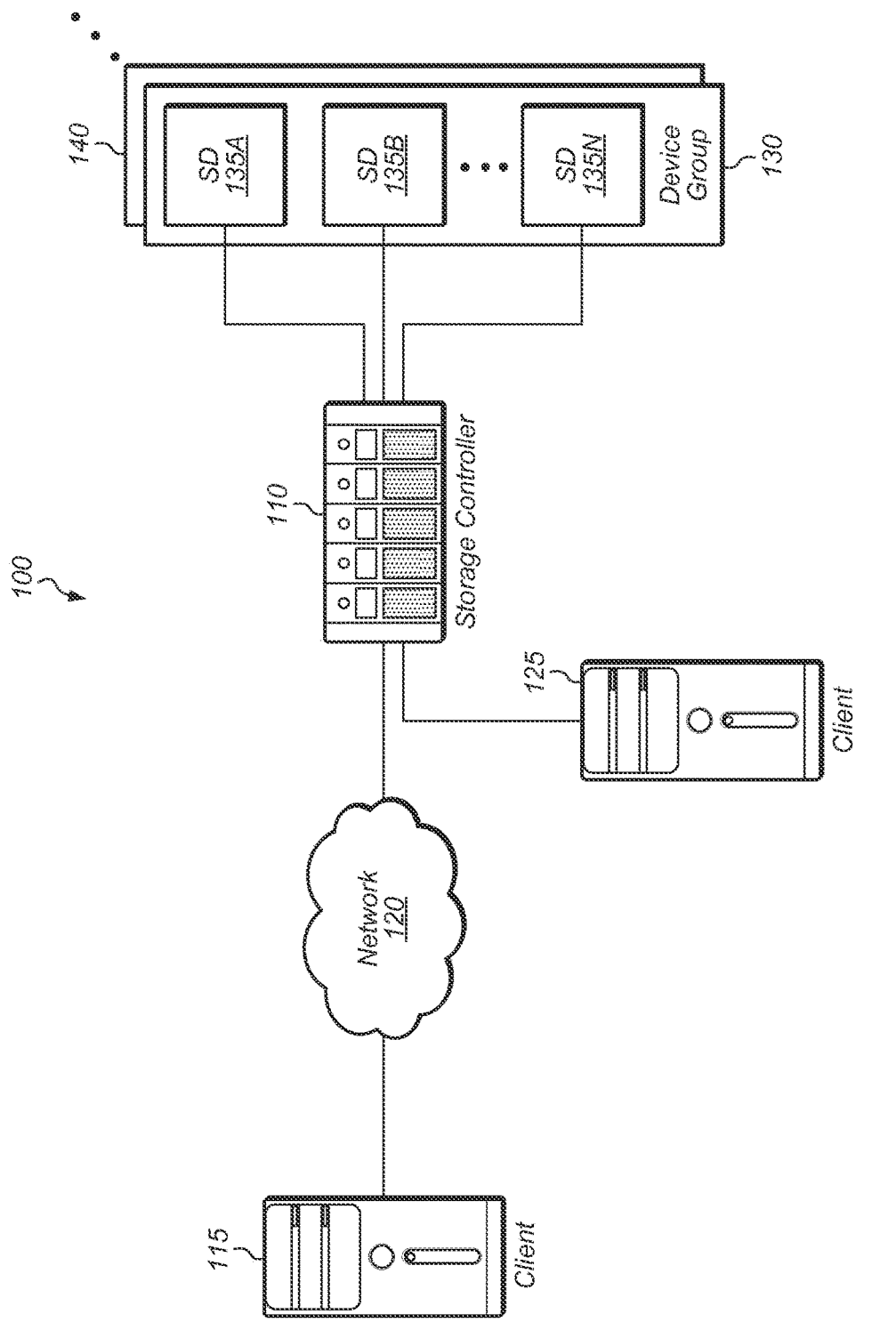
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring now to FIG. 1, a generalized block diagram of one embodiment of a storage system 100 is shown. Storage system 100 may include storage controller 110 and storage device groups 130 and 140, which are representative of any number of storage device groups (or data storage arrays). As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may utilize any of various deduplication, compression, or other techniques for reducing the amount of data stored in devices 135A-N by deduplicating common data.

Storage controller 110 may also be configured to create and manage snapshots in system 100. A set of mediums may be recorded and maintained by storage controller 110. Most of the mediums may be read-only except for one or more selected mediums such as the most recent medium in use by a particular volume. Each medium logically comprises all of the blocks in the medium. However, only the blocks that were changed from the time the medium was created to the time the medium was closed are saved and mappings to these blocks may also be maintained with the medium.

In various embodiments, multiple mapping tables may be maintained by storage controller 110. These mapping tables may include a medium mapping table and a volume-to-medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium during a lookup operation corresponding to a received read/write request. The term "mappings" is defined as the one or more entries of the address translation mapping table which convert a given medium ID and block number into a physical pointer value. This physical pointer value may then be used to locate a physical location within the storage devices 135A-N. It is noted the physical pointer value may be used to access another mapping table within a given storage device of the storage devices 135A-N. Consequently, one or more levels of indirection may exist between the physical pointer value and a target storage location.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
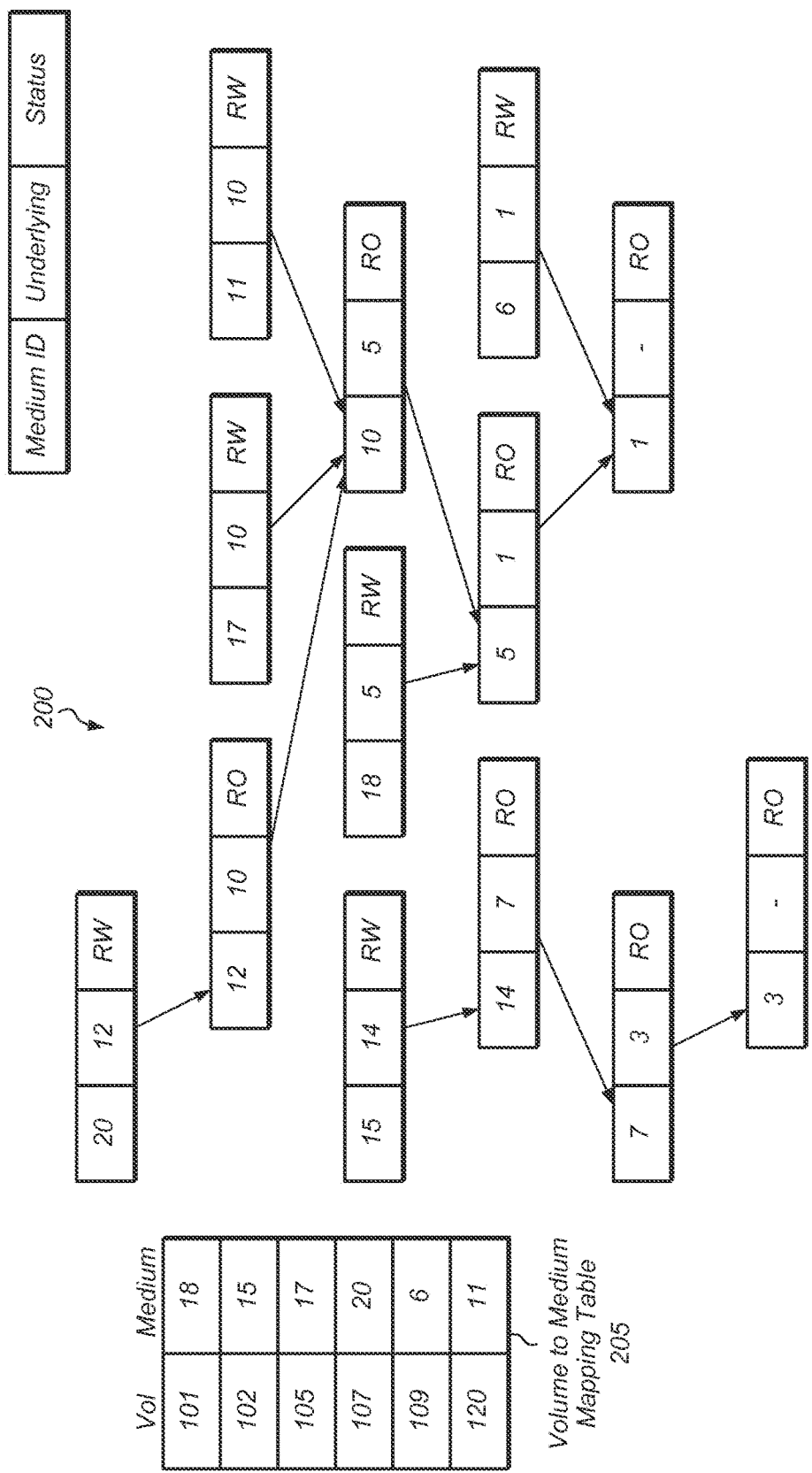
FIG. 2 is a generalized block diagram of one embodiment of a directed acyclic graph (DAG) of mediums.

Referring now to FIG. 2, a block diagram illustrating a directed acyclic graph (DAG) 200 of mediums is shown. Also shown is a volume to medium mapping table 205 which shows which medium a volume maps to for each volume in use by a storage system. Volumes may be considered pointers into graph 200.

The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

The term medium is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

It is also noted that the term "volume to medium mapping table" may refer to multiple tables rather than just a single table. Similarly, the term "medium mapping table" may also refer to multiple tables rather than just a single table. It is further noted that volume to medium mapping table 205 is only one example of a volume to medium mapping table. Other volume to medium mapping tables may have other numbers of entries for other numbers of volumes.

Each medium is depicted in graph 200 as three conjoined boxes, with the leftmost box showing the medium ID, the middle box showing the underlying medium, and the rightmost box displaying the status of the medium (RO—read-only) or (RW—read-write). Within graph 200, a medium points to its underlying medium. For example, medium 20 points to medium 12 to depict that medium 12 is the underlying medium of medium 20. Medium 12 also points to medium 10, which in turn points to medium 5, which in turn points to medium 1. Some mediums are the underlying medium for more than one higher-level medium. For example, three separate mediums (12, 17, 11) point to medium 10, two separate mediums (18, 10) point to medium 5, and two separate mediums (6, 5) point to medium 1. Each of the mediums which is an underlying medium to at least one higher-level medium has a status of read-only.

The set of mediums on the bottom left of graph 200 is an example of a linear set. As depicted in graph 200, medium 3 was created first and then a snapshot was taken resulting in medium 3 becoming stable (i.e., the result of a lookup for a given block in medium 3 will always return the same value after this point). Medium 7 was created with medium 3 as its underlying medium. Any blocks written after medium 3 became stable were labeled as being in medium 7. Lookups to medium 7 return the value from medium 7 if one is found, but will look in medium 3 if a block is not found in medium 7. At a later time, a snapshot of medium 7 is taken, medium 7 becomes stable, and medium 14 is created. Lookups for blocks in medium 14 would check medium 7 and then medium 3 to find the targeted logical block. Eventually, a snapshot of medium 14 is taken and medium 14 becomes stable while medium 15 is created. At this point in graph 200, medium 14 is stable with writes to volume 102 going to medium 15.

Volume to medium mapping table 205 maps user-visible volumes to mediums. Each volume may be mapped to a single medium, also known as the anchor medium. This anchor medium, as with all other mediums, may take care of its own lookups. A medium on which multiple volumes depend (such as medium 10) tracks its own blocks independently of the volumes which depend on it. Each medium may also be broken up into ranges of blocks, and each range may be treated separately in medium DAG 200.

Referring now to FIG. 3, one embodiment of a medium mapping table 300 is shown. Any portion of or the entirety of medium mapping table 300 may be stored in storage controller 110 and/or in one or more of storage devices 135A-N. A volume identifier (ID) may be used to access volume to medium mapping table 205 to determine a medium ID corresponding to the volume ID. This medium ID may then be used to access medium mapping table 300. It is noted that table 300 is merely one example of a medium mapping table, and that in other embodiments, other medium mapping tables, with other numbers of entries, may be utilized. In addition, in other embodiments, a medium mapping table may include other attributes and be organized in a different manner than that shown in FIG. 3.

Each medium may be identified by a medium ID, as shown in the leftmost column of table 300. A range attribute may also be included in each entry of table 300, and the range may be in terms of data blocks. The size of a block of data (e.g., 4 KB, 8 KB) may vary depending on the embodiment. A medium may be broken up into multiple ranges, and each range of a medium may be treated as if it is an independent medium with its own attributes and mappings. For example, medium ID 2 has two separate ranges. Range 0-99 of medium ID 2 has a separate entry in table 300 from the entry for range 100-999 of medium ID 2.

Although both of these ranges of medium ID 2 map to underlying medium ID 1, it is possible for separate ranges of the same source medium to map to different underlying mediums. For example, separate ranges from medium ID 35 map to separate underlying mediums. For example, range 0-299 of medium ID 35 maps to underlying medium ID 18 with an offset of 400. This indicates that blocks 0-299 of medium ID 35 map to blocks 400-699 of medium ID 18. Additionally, range 300-499 of medium ID 35 maps to underlying medium ID 33 with an offset of −300 and range 500-899 of medium ID 35 maps to underlying medium ID 5 with an offset of −400. These entries indicate that blocks 300-499 of medium ID 35 map to blocks 0-199 of medium ID 33 while blocks 500-899 of medium ID 35 map to blocks 100-499 of medium ID 5. It is noted that in other embodiments, mediums may be broken up into more than three ranges.

The state column of table 300 records information that allows lookups for blocks to be performed more efficiently. A state of "Q" indicates the medium is quiescent, "R" indicates the medium is registered, and "U" indicates the medium is unmasked. In the quiescent state, a lookup is performed on exactly one or two mediums specified in table 300. In the registered state, a lookup is performed recursively. The unmasked state determines whether a lookup should be performed in the basis medium, or whether the lookup should only be performed in the underlying medium. Although not shown in table 300 for any of the entries, another state "X" may be used to specify that the source medium is unmapped. The unmapped state indicates that the source medium contains no reachable data and can be discarded. This unmapped state may apply to a range of a source medium. If an entire medium is unmapped, then the medium ID may be entered into a sequence invalidation table and eventually discarded.

In one embodiment, when a medium is created, the medium is in the registered state if it has an underlying medium, or the medium is in the quiescent state if it is a brand-new volume with no pre-existing state. As the medium is written to, parts of it can become unmasked, with mappings existing both in the medium itself and the underlying medium. This may be done by splitting a single range into multiple range entries, some of which retain the original masked status, and others of which are marked as unmasked.

In addition, each entry in table 300 may include a basis attribute, which indicates the basis of the medium, which in this case points to the source medium itself. Each entry may also include an offset field, which specifies the offset that should be applied to the block address when mapping the source medium to an underlying medium. This allows mediums to map to other locations within an underlying medium rather than only being built on top of an underlying medium from the beginning block of the underlying medium. As shown in table 300, medium 8 has an offset of 500, which indicates that block 0 of medium 8 will map to block 500 of its underlying medium (medium 1). Therefore, a lookup of medium 1 via medium 8 will add an offset of 500 to the original block number of the request. The offset column allows a medium to be composed of multiple mediums. For example, in one embodiment, a medium may be composed of a "gold master" operating system image and per-VM (virtual machine) scratch space. Other flexible mappings are also possible and contemplated.

Each entry also includes an underlying medium attribute, which indicates the underlying medium of the source medium. If the underlying medium points to the source medium (as with medium 1), then this indicates that the source medium does not have an underlying medium, and all lookups will only be performed in the source medium. Each entry may also include a stable attribute, with "Y" (yes) indicating the medium is stable (or read-only), and with "N" (no) indicating the medium is read-write. In a stable medium, the data corresponding to a given block in the medium never changes, though the mapping that produces this data may change. For example, medium 2 is stable, but block 50 in medium 2 might be recorded in medium 2 or in medium 1, which are searched logically in that order, though the searches may be done in parallel if desired. In one embodiment, a medium will be stable if the medium is used as an underlying medium by any medium other than itself.

Figure 4:
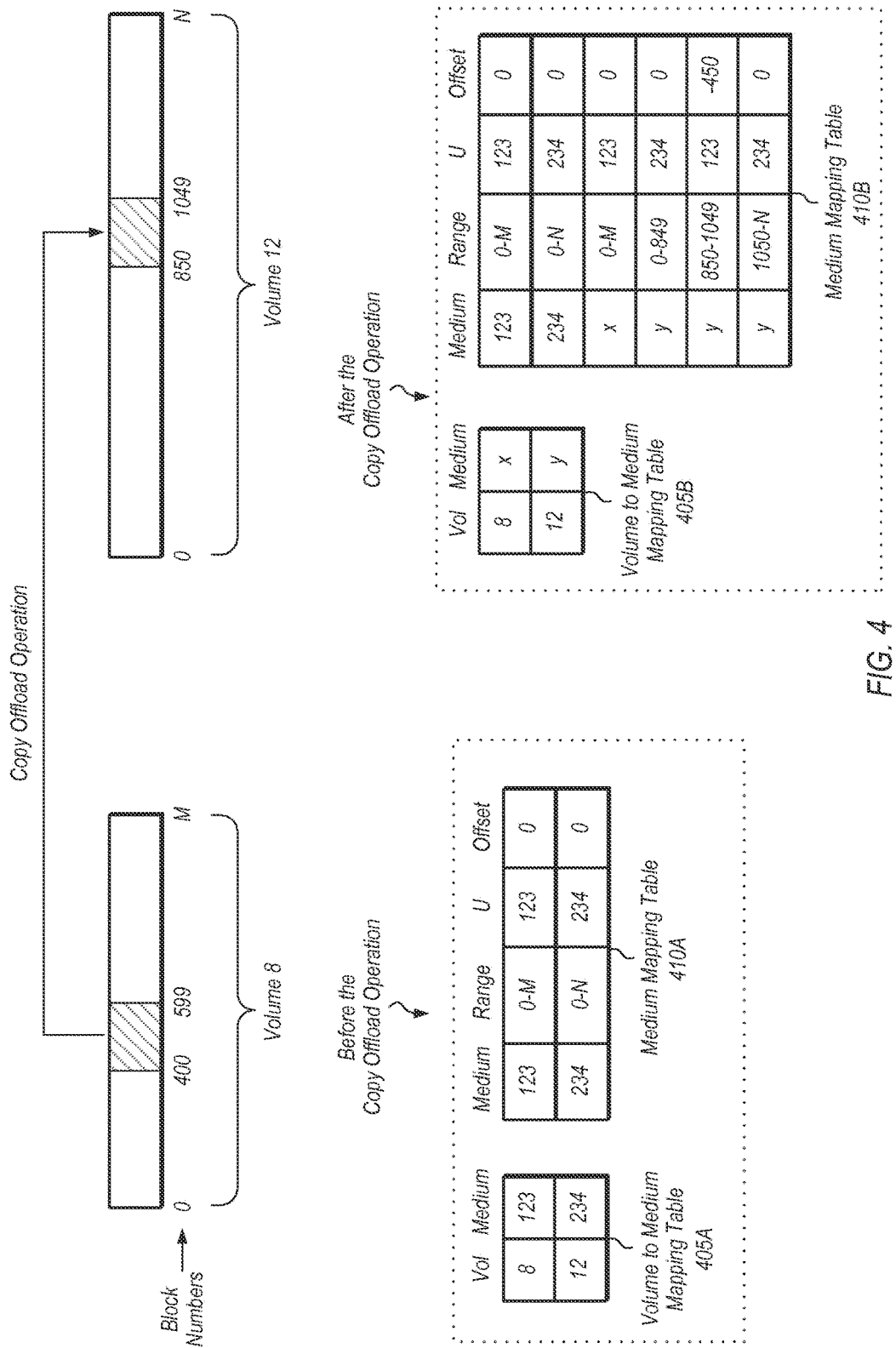
FIG. 4 illustrates one embodiment of a copy offload operation.

Turning now to FIG. 4, one embodiment of a copy offload operation is shown. The copy offload operation depicted in FIG. 4 specifies that blocks 400-599 of volume 8 are to be copied to blocks 850-1049 of volume 12. While the logical representations of volume 8 and volume 12 are depicted in FIG. 4 as contiguous data structures, it should be understood that the data corresponding to volumes 8 and volumes 12 may be located at many separate, non-contiguous locations throughout the storage devices of the host storage system.

The storage controller may determine which mediums are pointed to by volume 8 and volume 12 in response to receiving a request to perform this copy offload operation. In one embodiment, the storage controller may query a volume-to-medium mapping table to determine the anchor mediums of volume 8 and volume 12. It may be assumed for the purposes of this discussion that the anchor medium of volume 8 is medium 123 and that the anchor medium of volume 12 is medium 234 (as shown in volume-to-medium mapping table 405A, which represents two entries of the volume-to-medium mapping table before the copy offload operation is performed). Also, medium mapping table 410A represents two entries of the medium mapping table before the copy offload operation is performed.

To perform the requested copy offload operation, the storage controller may create medium 'x', and record medium 123 as an underlying medium of medium x. At this point, medium 123 becomes stable. The value 'x' may be any medium ID value that is not currently in use. Also, volume 8 may be updated to point to medium x, as shown in volume-to-medium mapping table 405B (representing two entries of the volume-to-medium mapping table after the copy offload operation is performed). Additionally, medium 'y' may be created, and medium 234 may be recorded as an underlying medium of medium y. Also, volume 12 may be updated so that it points at medium y. An entry may be created for the range of medium y being copied to, and this entry may have medium 123 recorded as its underlying (U) medium. All other entries for other ranges of medium y may have medium 234 as the underlying medium. These entries are shown in medium mapping table 410B, which represents a portion of the medium mapping table after the copy offload operation is performed. It is noted that the entries of medium mapping tables 410A-B may include additional information to what is shown in FIG. 4.

By performing the copy offload operation in accordance with the above steps, the storage controller is able to perform the requested copy offload operation without actually copying the data blocks in question. Instead, the copy offload operation is fulfilled solely by making changes to the volume-to-medium mapping table and the medium mapping table. As a result, no immediate data writes are performed in implementing the copy offload operation, and copy offload operations can be performed quickly with minimal resource utilization.

The above description of a copy offload operation may also be applied to other embodiments in which other types of copy offload operations are performed. For example, in another embodiment, a copy offload operation may be requested from a first range of a first volume to multiple separate volumes. For this copy offload operation, the steps described above corresponding to medium 'x' and volume 8 may be performed once for the source volume. The steps corresponding to medium 'y' and volume 12 may be repeated for each destination volume that is targeted by this copy offload operation, with a new medium being created for each destination volume.

In some embodiments, the steps described above for performing the copy offload operation may be buffered rather than being implemented immediately upon receipt of the request to perform the copy offload operation. Multiple copy offload operations may be buffered and then performed later in a batch mode. Additionally, in some embodiments, the steps of the copy offload operation corresponding to the source volume may be delayed until a request targeting the source volume is received by the storage controller. At that point in time, the portion of the copy offload operation corresponding to the source volume may be performed. Similarly, the steps of the copy offload operation corresponding to the destination volume may be delayed until a request targeting the destination volume is received by the storage controller.

Figure 5:
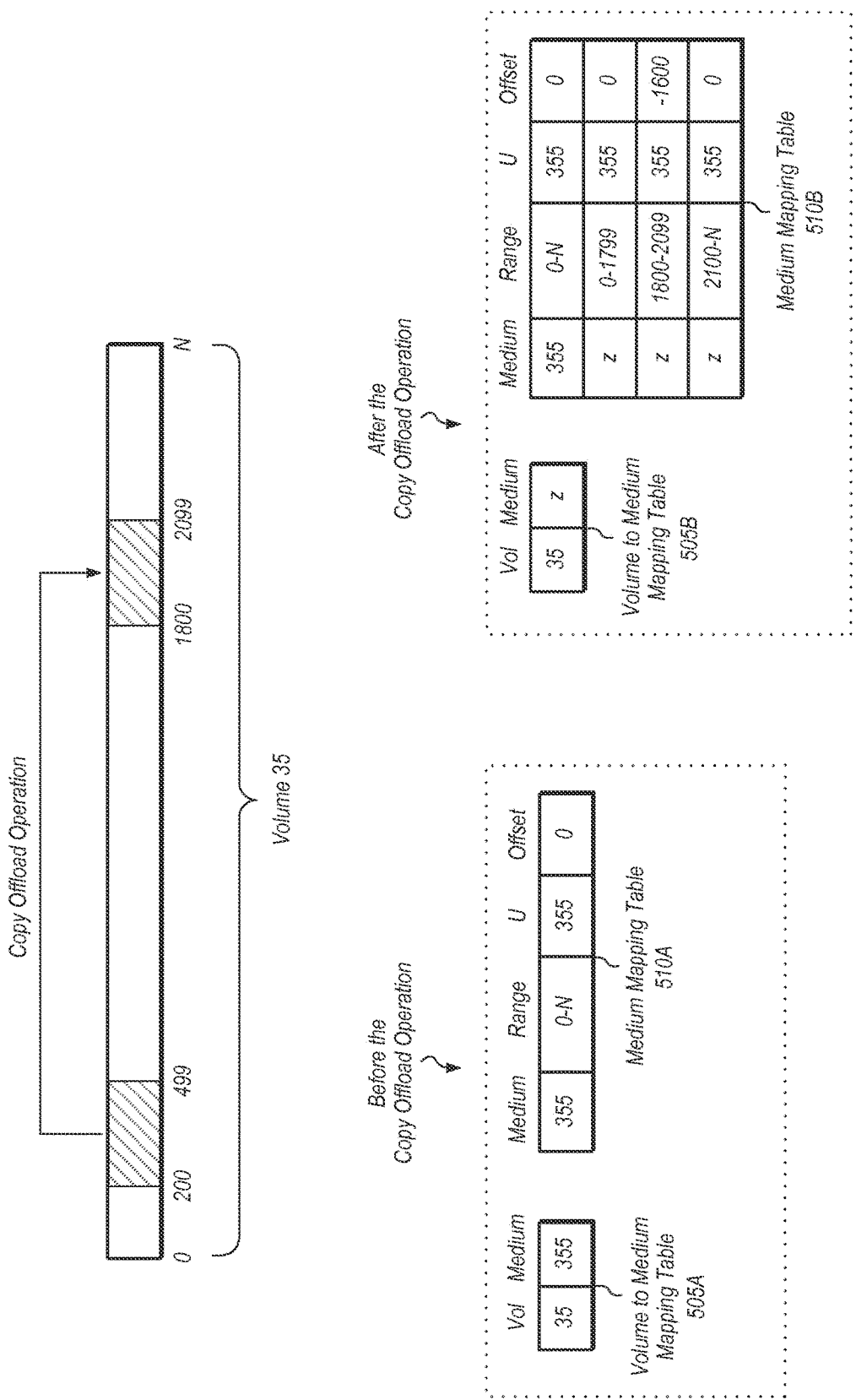
FIG. 5 is a generalized block diagram of another embodiment of a copy offload operation.

Referring now to FIG. 5, a block diagram of another embodiment of a copy offload operation is shown. In this copy offload operation, a set of data blocks is being copied from a first location within a volume to a second location within the same volume. A logical representation of volume 35 is shown in FIG. 5, and data is being copied from locations 200-499 to locations 1800-2099. It may be assumed for the purposes of this discussion that medium 355 is the anchor medium of volume 35, as shown in table 505A. The entry for medium 355 is shown in medium mapping table 510A, which is representative of one entry of the medium mapping table before the copy offload operation is performed.

In one embodiment, in response to receiving a request to perform this copy offload operation, the storage controller may create a new medium 'z'. Medium z may be recorded as the anchor medium of volume 35, as shown in table 505B. Also, three separate entries for medium z may be added to the medium mapping table (a portion of which is shown as table 510B). The first entry for medium z is for the range of data blocks from 0-1799, and the underlying (U) medium for this is recorded as medium 355. The offset for the first entry is set to 0. Similarly, the third entry for medium z for the range of data blocks from 2100-N has the same attributes as the first entry. The first and third entries each have an offset of 0, which is used when mapping to the underlying medium (medium 355). The second entry for medium z corresponds to the range (1800-2099) targeted by the copied data. The second entry also has medium 355 recorded as its underlying medium. However, the second entry has an offset of −1600 so as to map to the correct locations within medium 355 corresponding to the data specified in the copy offload operation.

By using the above-described techniques, the storage controller is able to accomplish the requested copy offload operation without physically copying the data blocks in question. Rather, the copy offload operation is performed merely by manipulating the volume and medium mapping tables without accessing the data blocks. The actual physical storage locations where the requested-for-copying data is stored are not accessed during this copy offload operation.

Figure 6:
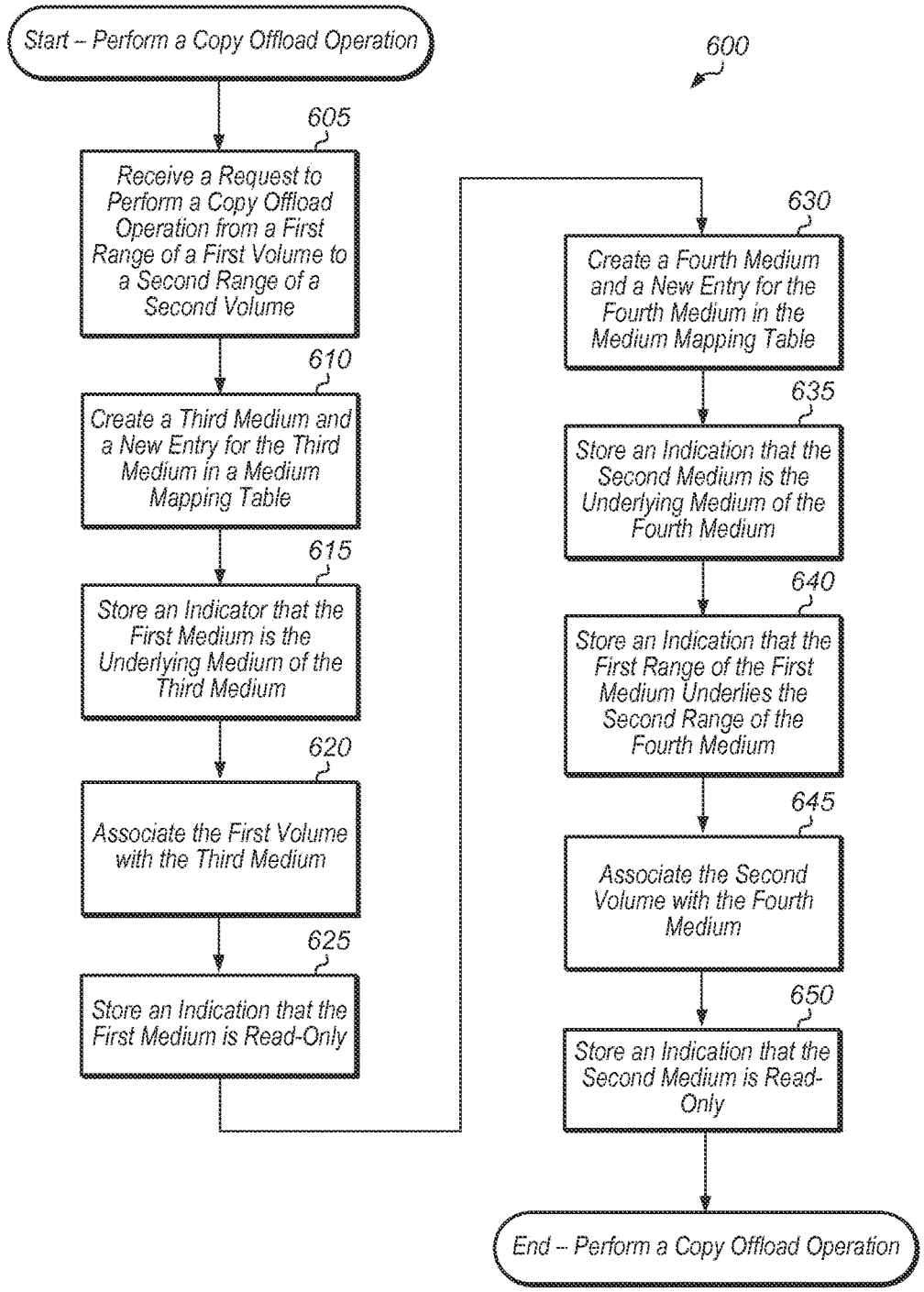
FIG. 6 is a generalized flow diagram illustrating one embodiment of a method for performing a copy offload operation.

Turning now to FIG. 6, one embodiment of a method 600 for performing a copy offload operation is shown. The components embodied in system 100 described above (e.g., storage controller 110) may generally operate in accordance with method 600. In addition, the steps in this embodiment are shown in sequential order. However, some steps may occur in a different order than shown, some steps may be performed concurrently, some steps may be combined with other steps, and some steps may be absent in another embodiment.

A request to perform a copy offload operation from a first range of a first volume to a second range of a second volume may be received by a storage controller (block 605). For purposes of discussion, it is assumed that the first volume is associated with (i.e., points to) a first medium. It is also assumed that the second volume points to a second medium. In one embodiment, these associations may be determined by querying the volume to medium mapping table.

In response to receiving this request, a third medium may be created and a new entry for the third medium may be created in the medium mapping table (block 610). In various embodiments, the process of creating a new medium involves generating a new ID for the medium and generating a new entry for the medium in the medium mapping table. An indication may be stored designating the first medium as the underlying medium of the third medium (block 615). In one embodiment, block 615 may be implemented by recording the first medium as the underlying medium of the third medium in the new entry of the medium mapping table.

Then, the volume to mapping table may be updated so that the first volume is associated with the third medium (block 620). In other words, the third medium may be specified as the anchor medium of the first volume. Also, an indicator may be stored specifying that the first medium is read-only (i.e., stable) (block 625). In one embodiment, this indicator may be stored in a corresponding entry in the medium mapping table.

Additionally, a fourth medium may be created and a new entry for the fourth medium may be created in the medium mapping table (block 630). The second medium may be designated as the underlying medium of the fourth medium (block 635). Also, an indication may be stored designating that the first range of the first medium underlies the second range of the fourth medium (block 640). A separate range entry may be created in the medium mapping table for the second range of the fourth medium, and this separate range entry may map the second range of the fourth medium to the first range of the first medium. In one embodiment, an offset value may be included in this range entry to specify how the second range of the fourth medium is aligned with the first range of the first medium. The second medium may remain as the underlying medium for all other ranges of the fourth medium.

In addition, the fourth medium may be specified as the anchor medium of the second volume (block 645). Still further, an indicator may be stored specifying that the second medium is read-only (block 650). After block 650, method 600 may end. Any number of copy offload operations may be performed in parallel using the above-described method.

It is noted that some of the steps above may be delayed until read or write operations are received which target the regions of the volumes affected by the copy offset operation.

Figure 7:
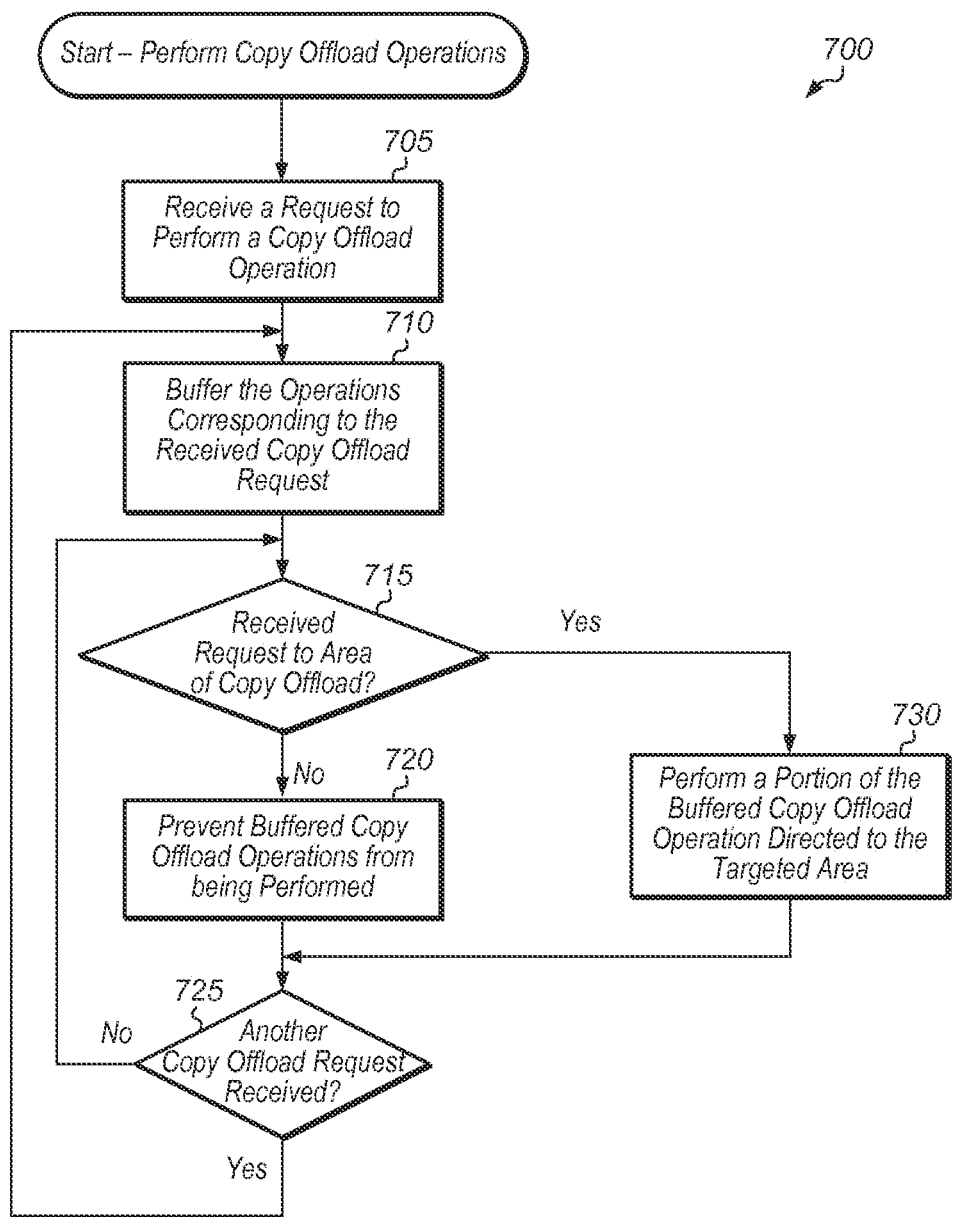
FIG. 7 is a generalized flow diagram illustrating one embodiment of another method for performing copy offload operations.

Referring now to FIG. 7, one embodiment of another method 700 for performing copy offload operations is shown. The components embodied in system 100 described above (e.g., storage controller 110) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

A request to perform a copy offload operation may be received by a storage controller (block 705). For the purposes of this discussion, it may be assumed that the objective of the copy offload operation is for data to be copied from a first range of a first volume to a second range of a second volume. However, other operations may have different sources and/or destinations. In response to receiving the request, the operations corresponding to the received copy offload request may be buffered rather than being immediately performed (block 710). In various embodiments, operations may be buffered separately. For example, the operations corresponding to the first volume may be generated, buffered, and made ready to be executed when the first range of the first volume is targeted by a subsequent request. Similarly, the operations corresponding to the second volume may be generated, buffered, and prepared for execution when the second range of the second volume is targeted.

After block 710, it may be determined if the storage controller has received a read or write request that targets an area affected by a previously received copy offload operation (conditional block 715). If a request targeting an affected location has not been received (conditional block 715, "no" leg), then the storage controller may prevent the buffered copy offload operation(s) from being performed (block 720). After block 720, it may be determined if another copy offload request has been received (conditional block 725). If a copy offload request has been received (conditional block 725, "yes" leg), then method 700 may return to block 710 to buffer the received copy offload request. It is noted that the storage controller may receive a copy offload request at any point in time (and not just at the point in time represented by block 725), in which case method 700 may accordingly jump to block 710 to buffer the received copy offload request. If a copy offload request has not been received (conditional block 725, "no" leg), then method 700 may return to block 715 to determine if a request targeting a region corresponding to a buffered copy offload request has been received.

If a request targeting an affected location has been received (conditional block 715, "yes" leg), then the corresponding copy offload operation may be performed by the storage controller (block 730). A buffered copy offload operation may target a source volume and a destination volume, and if a received request only targets one of these volumes, then only the copy offload operation targeting the affected volume may be performed. The other portion of the copy offload operation may remain buffered and may be performed at a later time (when its location within the corresponding volume is targeted or when processing resources are idle and available for use). After block 730, method 700 may return to block 725 to determine if another copy offload request has been received.

By waiting to perform a copy offload operation until a subsequent request targeting an affected area (or volume) is received, the processing resources on the storage system may be freed up to perform other tasks. Buffering copy offload operations also helps by preventing extra mediums from being created until these mediums are actually needed. Multiple copy offload operations may be received and buffered without unduly burdening the storage system. Also, during periods of time when storage system resources are available, the storage controller may use the idle processing capacity and perform a large number of buffered copy offload operations. In this way, the copy offload operations may be performed without interfering with other tasks being performed by the storage system. Accordingly, in some embodiments, rather than buffering all received copy offload operations as indicated by block 710, the storage controller may determine if a received copy offload operation should be buffered on a case by case basis. This determination may be based at least on the current operating conditions (e.g., processing load, storage utilization, number of pending requests) of the storage system. In other embodiments, received copy offload operations may be automatically buffered, and when the number of buffered copy offload operations exceeds a threshold, then the storage controller may perform multiple copy offload operations in a batch mode. In these embodiments, if a data request targeting an affected area is received, the corresponding buffered copy offload operation may be performed while the other copy offload operations remain buffered.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for use in a storage system, the method comprising:
   receiving a request to copy data of a volume; and
   responsive to receiving the request, performing a copy offload operation that includes:
   creating a first logical representation of the volume;
   mapping ranges of the volume to ranges of the first logical representation;
   creating a second logical representation of the first logical representation;
   mapping a first range and a second range of the second logical representation to a first range of the first logical representation; and
   mapping the ranges of the volume to ranges of the second logical representation.

2. The method as recited in claim 1, wherein the second logical representation of the first logical representation is created in response to a request to copy a first range of the volume to a second range of the volume; the method further comprising fulfilling the request to copy the first range of the volume without accessing the first range of the volume.

3. The method as recited in claim 1, further comprising delaying the creation of the second logical representation until receiving a write request targeting a first range of the volume.

4. The method as recited in claim 1, further comprising:
   receiving a write request targeting a second range of the volume;
   creating a third logical representation;
   storing an indication that the second logical representation underlies the third logical representation; and
   associating the second range of the volume with the third logical representation.

5. The method as recited in claim 4, further comprising storing an indication that the second logical representation is read-only responsive to storing the indication that the second logical representation underlies the third logical representation.

6. The method as recited in claim 1, wherein the first range is located at a first offset within the first logical representation, wherein the second range is located at a second offset within the first logical representation, the method further comprising storing a difference between the second offset and the first offset in an entry corresponding to the second range of the second logical representation in a mapping table.

7. The method as recited in claim 1, further comprising storing an indication that the first logical representation is read-only responsive to storing an indication that the first logical representation underlies the second logical representation.

8. A computer system comprising:
   one or more storage devices; and
   a storage controller coupled to the one or more storage devices;
   wherein responsive to receiving a request to copy data from a of a volume the storage controller is configured to perform a copy offload operation that includes:
   create a first logical representation of the volume;
   map ranges of the volume to ranges of the first logical representation;
   create a second logical representation of the first logical representation;
   map a first range and a second range of the second logical representation to a first range of the first logical representation; and
   map the ranges of the volume to ranges of the second logical representation.

9. The computer system as recited in claim 8, wherein the second logical representation is created in response to a request to copy a first range of the volume to a second range of the volume; and wherein the storage controller is further configured to fulfill the request to copy the first range of the volume without accessing the first range of the volume.

10. The computer system as recited in claim 8, wherein the storage controller is further configured to delay the creation of the second logical representation until receiving a write request targeting a first range of the volume.

11. The computer system as recited in claim 8, wherein the storage controller is further configured to:
receive a write request targeting a second range of the volume;
create a third logical representation;
store an indication that the second logical representation underlies the third logical representation; and
associate the second range of the volume with the third logical representation.

12. The computer system as recited in claim 11, wherein the storage controller is further configured to store an indication that the second logical representation is read-only responsive to storing the indication that the second logical representation underlies the third logical representation.

13. The computer system as recited in claim 8, wherein the first range is located at a first offset within the first logical representation, wherein the second range is located at a second offset within the first logical representation, wherein the storage controller is further configured to store a difference between the second offset and the first offset in an entry corresponding to the second range of the second logical representation in a mapping table.

14. The computer system as recited in claim 8, wherein the storage controller is further configured to store an indication that the first logical representation is read-only responsive to storing the indication that the first logical representation underlies the second logical representation.

15. A computer program product disposed upon a non-transitory computer readable medium, the computer program product comprising computer program instructions that, when executed, cause a computer to carry out the steps of:
receiving a request to copy data from a volume; and
responsive to receiving the request, performing a copy offload operation that includes:
creating a first logical representation of the volume;
mapping ranges of the volume to ranges of the first logical representation;
creating a second logical representation of the first logical representation;
mapping a first range and a second range of the second logical representation to a first range of the first logical representation; and
mapping the ranges of the volume to ranges of the second logical representation.

16. The computer program product as recited in claim 15 wherein the second logical representation is created in response to a request to copy a first range of the volume to a second range of the volume; wherein the computer program product further comprises computer program instructions that, when executed, cause the computer to carry out the step of fulfilling the request to copy the first range of the volume without accessing the first range of the volume.

17. The computer program product as recited in claim 15 further comprising computer program instructions that, when executed, cause the computer to carry out the step of delaying the creation of the second logical representation until receiving a write request targeting a first range of the volume.

18. The computer program product as recited in claim 15 further comprising computer program instructions that, when executed, cause the computer to carry out the steps of:
receiving a write request targeting a second range of the volume;
creating a third logical representation;
storing an indication that the second logical representation underlies the third logical representation; and
associating the second range of the volume with the third logical representation.

19. The computer program product as recited in claim 15 wherein the first range is located at a first offset within the first logical representation, wherein the second range is located at a second offset within the first logical representation, the computer program product further comprising computer program instructions that, when executed, cause the computer to carry out the step of storing a difference between the second offset and the first offset in an entry corresponding to the second range of the second logical representation in a mapping table.

20. The computer program product as recited in claim 15 further comprising computer program instructions that, when executed, cause the computer to carry out the step of storing an indication that the first logical representation is read-only responsive to storing an indication that the first logical representation underlies the logical representation.

\* \* \* \* \*